(12) United States Patent  
Georgiou et al.

(10) Patent No.: US 11,966,044 B2  
(45) Date of Patent: Apr. 23, 2024

(54) DISPLAY WITH EYE TRACKING AND ADAPTIVE OPTICS

(71) Applicant: Microsoft Technology Licensing, LLC, Redmond, WA (US)

(72) Inventors: Andreas Georgiou, Cambridge (GB); Alfonsus D. Lunardhi, San Ramon, CA (US); Joel Steven Kollin, Seattle, WA (US); Bernard C. Kress, Seattle, WA (US); Ishan Chatterjee, Seattle, WA (US); Mario Possiwan, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 17/967,496

(22) Filed: Oct. 17, 2022

(65) Prior Publication Data  
US 2023/0031857 A1 Feb. 2, 2023

Related U.S. Application Data

(62) Division of application No. 16/779,034, filed on Jan. 31, 2020, now Pat. No. 11,500,200.

(51) Int. Cl.  
*G02B 27/00* (2006.01)  
*G02B 27/01* (2006.01)  
*G02F 1/29* (2006.01)

(52) U.S. Cl.  
CPC ..... *G02B 27/0068* (2013.01); *G02B 27/0093* (2013.01); *G02B 27/0172* (2013.01); *G02F 1/29* (2013.01); *G02B 2027/011* (2013.01)

(58) Field of Classification Search  
CPC .......... G02B 27/0068; G02B 27/0093; G02B 27/0172; G02B 2027/011; G02F 1/29  
See application file for complete search history.

(56) References Cited

U.S. PATENT DOCUMENTS

| | | | |
|---|---|---|---|
| 2001/0043163 A1* | 11/2001 | Waldern | G02B 27/0093 345/7 |
| 2016/0223817 A1* | 8/2016 | Kizu | G02B 3/0056 |
| 2017/0176818 A1* | 6/2017 | Shi | G02F 1/137 |

* cited by examiner

*Primary Examiner* — Nathanael R Briggs  
(74) *Attorney, Agent, or Firm* — Rainier Patents, P.S.

(57) ABSTRACT

This document relates to an optical device that uses adaptive optics as part of an optical system. The adaptive optics can be used to correct light rays that correspond to a portion of an eye box based on information received from an eye-tracking unit, and can also correct for aberrations in the optics in the optical device. The adaptive optics include corrective elements that can be modified using modifying elements to correct the angle of light rays, such that rays associated with a specific pupil position and gaze direction of a user's eye can be made parallel and ensure a high quality image is viewed by the user.

20 Claims, 9 Drawing Sheets

DISPLAY WITH EYE TRACKING AND ADAPTIVE OPTICS

BACKGROUND

Display technology is advancing in the areas of augmented reality (AR) and virtual reality (VR) to provide users with more immersive visual experiences. For example, in some AR applications, generated imagery can be displayed to a user via a transparent display that also allows the user to view the surrounding physical environment. The generated imagery enhances or augments the user's experience or knowledge of the surrounding physical environment. Alternatively, in some VR applications, imagery representing a physical environment can be computer-generated or captured using an imaging device, such as a camera, and projected onto a user's eye through an occlusive display and an optical system to give the user the impression that they are in the physical environment. In certain instances, this can be referred to as "video AR" as opposed to "optical AR" which relies on the viewer seeing the physical environment through a transparent optical system.

Near-eye display (NED) devices that can provide such AR or VR experiences can be constructed a variety of different ways. For example, NED devices may utilize a series of lenses for refracting light in certain VR implementations. Alternatively, in certain AR implementations, an optical waveguide can be used to spatially translate a generated image from one position to another position in an optical system. Such an optical waveguide can be made of a substrate that can spatially translate propagating light rays representing imagery generated by a light engine and convey them along an optical path toward one or both eyes of a user.

Either by way of a series of lenses (such as in a VR implementation) or by way of waveguides (such as in an AR implementation), the imagery can be typically reproduced over an image area called an "eye box" that can correspond to various positions and angular directions associated with the user's eye. Such technology may be incorporated into an NED device in the form of eyeglasses, goggles, a helmet, a visor, or some other type of head-mounted display (HMD) device or eyewear.

However, for typical NED devices, reproduction of an image having a wide field of view (FOV) can be difficult, as existing techniques for displaying a high FOV image typically attempt to optimize the image over the entire eye box in order to account for a user's eye movement in any direction, along with variances in eye shape and size. This full eye box image optimization subsequently results in an overly heavy and expensive NED device in order to perform such optimization, as complex, expensive, and bulky optical components can be used in order to perform such optimization. As such, there remain difficulties in generating a consistently high-quality image in a light-weight and cost-effective NED device.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 3A-9 illustrate example techniques that are consistent with some implementations of the present concepts.

DETAILED DESCRIPTION

Overview

Certain NED devices, such as HMD devices, can include optical systems for spatially translating a generated image from one position to another position, for example from a light engine to an eye of a user. Such optical systems can include one or more transparent waveguides arranged so that they are located directly in front of each eye of the user when the NED device is worn by the user, to project light representing generated images into the eye of the user. In NED devices that utilize these waveguides, light can propagate through the waveguides over certain internal angles. Light propagating at some non-zero angle of incidence to a surface of the waveguide can travel within the waveguide via a transmissive substrate, bouncing back and forth between the surfaces via total internal reflection (TIR).

With such a configuration, images generated by the NED device can be overlaid on the user's view of the surrounding physical environment. One aspect of generating an image for propagation through the NED device involves the generation of light rays via a light engine, which are then typically collimated through a display engine to "paint" the image over an eye box corresponding a user's eye, where the eye box can be defined as a range of possible pupil positions and gaze directions of a user's eye. Due to the variability of head sizes and the variability of interpupillary distances of users of the NED device, and because it is difficult to know exactly where a user's gaze may be directed, the NED device typically optimizes the generated image for a substantial range of image angles and pupil positions in order to account for all possible positions of a user's eye.

However, at any one time, only a small section of the eye box may be utilized based on the user's eye position, and yet the image generated by the NED device can typically encompass the entire eye box. However, due to potential optical imperfections in the optical elements of the NED device, image quality over the entire eye box may be less than optimal. Moreover, expensive processing can be required in order to ensure that a high quality image is visible throughout the entire area of the eye box. Yet due to the eye's foveated nature, much of this expensive processing is wasted, as a user can typically only perceive a small portion of the image corresponding to the pupil's line of sight in high resolution, while peripheral areas of the eye have lower perceptive power.

As such, by determining the pupil position and gaze direction of a user's eye, the NED device can correct for imperfections in the optical elements, and furthermore, the NED device would not be required to produce a high resolution image over the entire eye box. Therefore, image correction and/or optimization, or processing can be reserved for a limited area corresponding to the pupil position and gaze direction of the user's eye, while the remaining peripheral areas of the image can utilize a lower image quality.

To account for the changing position of the pupil, an eye-tracking unit can determine the appropriate pupil position and gaze direction of the user's eye, and adaptive optics can be utilized to provide an optimized image that corresponds to the eye position, rather than needing to generate an optimized image over the entire eye box. For example, in an NED device that does not utilize eye tracking, the device may be required to optimize an image over an eye box that can span up to 20 mm, while introducing eye tracking can reduce the optimization space to 5 mm, preventing unnecessarily expensive processing. Additionally, the adaptive optics can be utilized to correct for aberration that may be exhibited by the optical elements used in the NED device.

Accordingly, implementations disclosed herein are directed to an NED device that can utilize an eye-tracking unit to determine a pupil position and gaze direction of a user's eye. Based at least on the data from the eye-tracking unit, a display engine can utilize adaptive optics to direct high resolution light rays toward the user's eye, while allowing lower resolution light rays to be received by the periphery of the user's eye. As such, the NED device does not need to produce a high resolution image for the entire area of possible eye movement, because the NED device can determine the specific position and gaze direction of the user's pupil. The NED device can therefore include higher resolution displays utilizing simpler and thinner optical components.

Example Device

Figure 1:
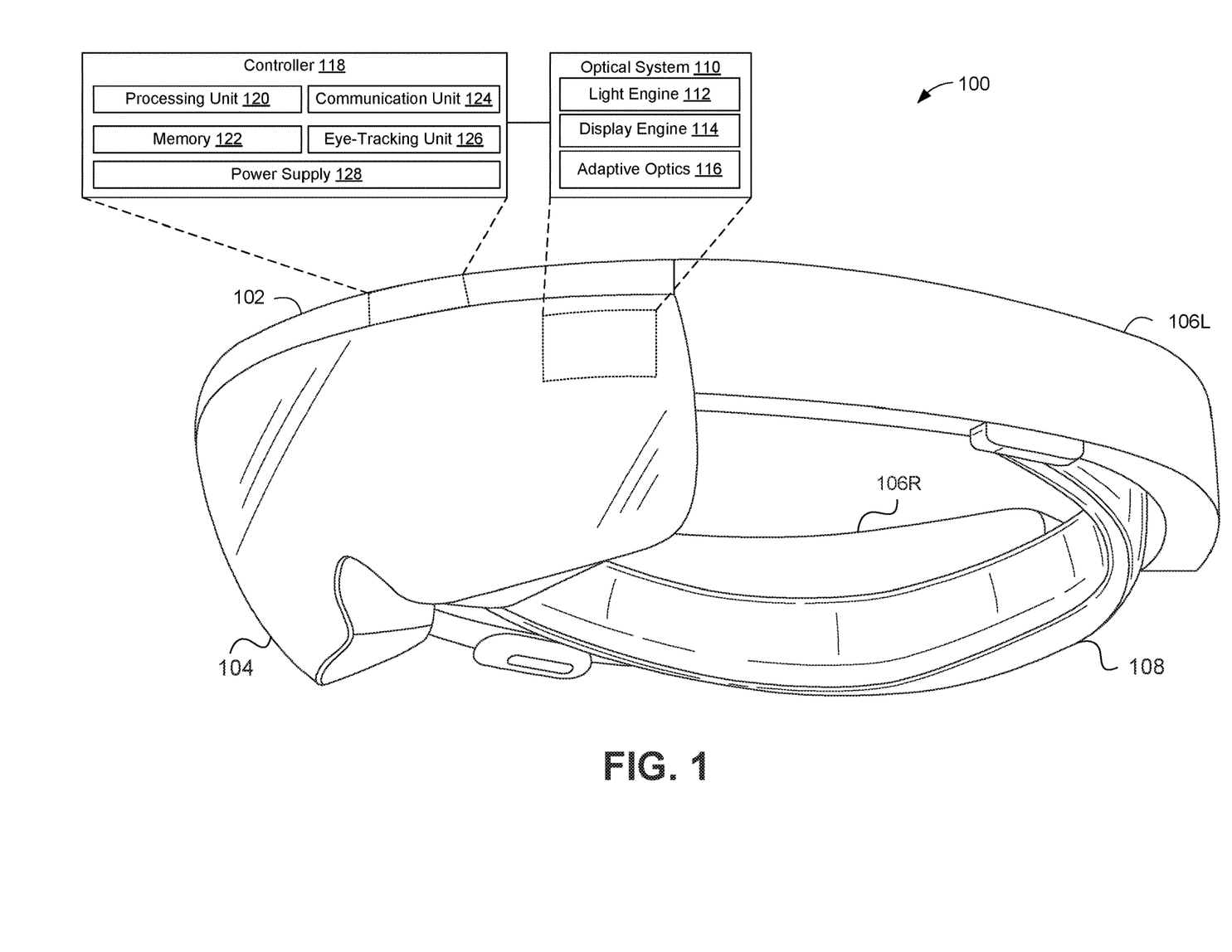
FIGS. 1, 2A, and 2B illustrate an example device that is consistent with some implementations of the present concepts.

FIG. 1 depicts an example NED device 100 which can implement the present concepts. The NED device 100 may provide VR and/or AR display modes for a user, i.e., the wearer of the device. To facilitate description, it is henceforth assumed that the NED device 100 is an HMD device designed for AR visualization.

As depicted in FIG. 1, NED device 100 can include a chassis 102, along with a protective visor 104, left side arm 106L, and right side arm 106R, which all may be mounted to chassis 102. Visor 104 may be a transparent material that can form a protective enclosure for various display elements coupled to the visor that are discussed below. Chassis 102 may provide a mounting structure for visor 104 and side arms 106L and 106R, and may be further connected to an adjustable headband 108 that enables wearing of NED device 100 on a user's head. An optical system 110 mounted to chassis 102 and enclosed within protective visor 104 can generate images for AR visualization, and is described in greater detail below.

In one implementation, optical system 110 may include a light engine 112, which may generate light rays representing the image for displaying via NED device 100. Light engine 112 may be any sort of device capable of emitting light, such as one or more light emitting diodes or laser diodes. Optical system 110 may also include a display engine 114 for collimating the emitted light rays generated by light engine 112 and directing the light rays as appropriate. However, it is to be appreciated that in certain implementations display engine 114 need not collimate the light rays, but the light rays may appear to converge from a point at finite distance from a user of NED device 100, assuming that NED device 100 does not make use of waveguides for image reproduction. In one implementation, display engine 114 may utilize a single optical element such as a reflective mirror, or may alternatively utilize a micro-lens array (MLA) that may utilize multiple optical elements that reflect the light rays toward the user's eye to create the generated image. Optical system 110 may further include adaptive optics 116, which may perform correction of light rays received from display engine 114, the specifics of which are discussed in further detail below.

Protective visor 104 and/or chassis 102 may also house controller 118, which may include various components for providing functionality to NED device 100. In one implementation, controller 118 may include various components such as a processing unit 120, a memory 122 accessible to the processing unit 120 for storing processor readable instructions and data, a communication unit 124 communicatively coupled to the processing unit 120 which can act as a network interface for connecting the NED device to another computer system, and an eye-tracking unit 126 that may be configured to track a current pupil position and gaze direction of a user's eye.

Controller 118 may provide commands and instructions to optical system 110 for generating images for AR visualization, and in some implementations, can also receive eye-tracking information that can be used by processing unit 120 to control display engine 114 and adaptive optics 116 to generate an image that can correspond to the user's eye position. Such eye-tracking information can be provided from eye-tracking unit 126. For example, eye-tracking unit 126 may also include a detecting feature that can capture light reflected from a cornea of the user's eye, such as by detecting glints of light and/or other detectable features associated with the user's eye, to determine the pupil position and gaze direction of the eye. Eye tracking unit 126 can further be configured to detect dilation amounts associated with the user's eye, which can be utilized by adaptive optics 116 to adjust the size of the eye box associated with the dilated eye.

Processing unit 120 may include one or more processors including a central processing unit (CPU) and/or a graphics processing unit (GPU). Memory 122 can be a computer-readable storage media that may store instructions for execution by processing unit 120, to provide various functionality to NED device 100. Finally, a power supply 128 can provide power for the components of controller 118 and the other components of NED device 100, such as optical system 110 and additional components that may be included in NED device 100, such as image capture devices (e.g. cameras), audio devices (e.g. microphones and speakers), and location/motion capture devices (e.g. accelerometers).

Figure 2A:
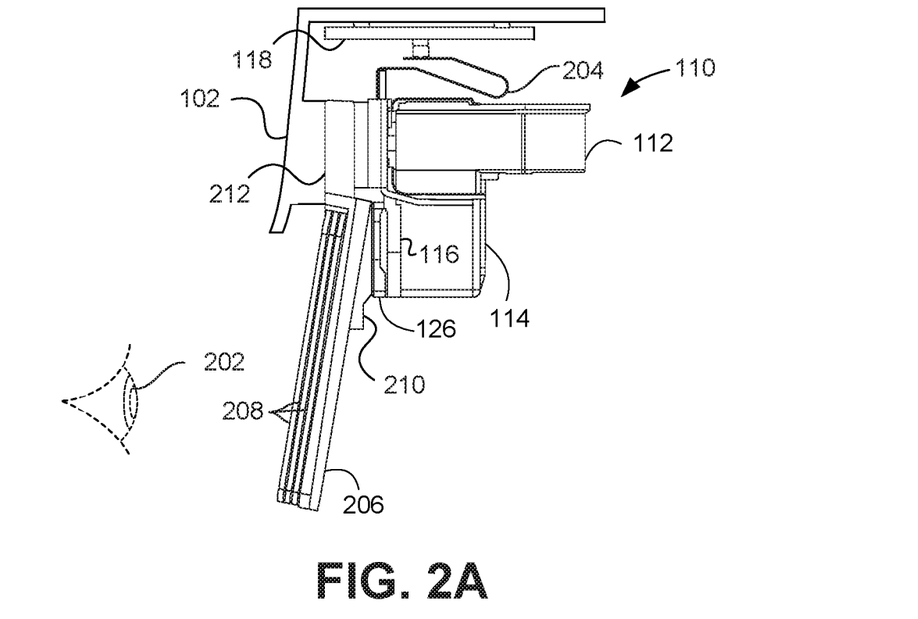
Figure 2B:
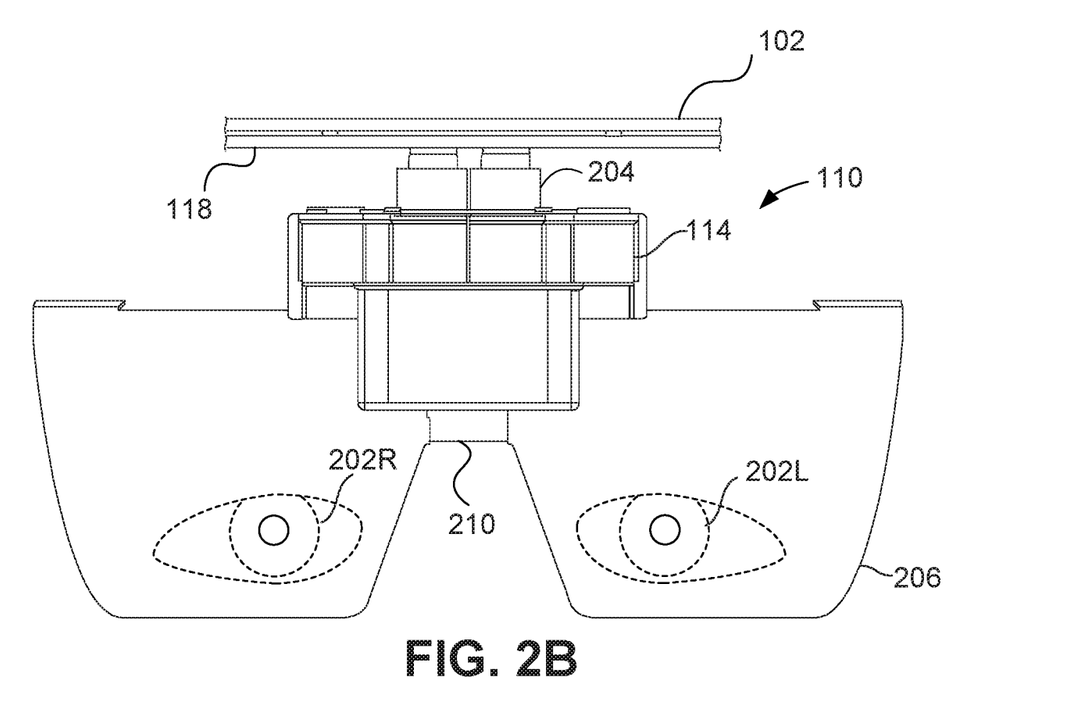

FIGS. 2A and 2B depict, in accordance with certain implementations, right side and front orthogonal views, respectively, of aspects that may be part of optical system 110 and may be contained within protective visor 104 of NED device 100 for propagation of imagery toward a user's eye 202. During operation of NED device 100, the display components can be positioned relative to the user's left eye 202L and right eye 202R as shown. The display components can be mounted to an interior surface of the chassis 102, which is shown in cross-section in FIG. 2A.

The display components can be designed to overlay three-dimensional images on the user's view of his real-world environment, e.g., by projecting light into the user's eyes. Light rays from light engine 112 may be directed by way of display engine 114 toward adaptive optics 116, which can be utilized to perform optimization and correction of certain light rays according to the user's eye-tracking information provided by eye-tracking unit 126. Furthermore, optical system 110 may be connected via a flexible circuit connector 204 to controller 118 for controlling the generation of light rays and the modification of adaptive optics 116. For example, controller 118 may issue instructions to adaptive optics 116 to appropriately redirect light rays representing the generated image in order to follows the user's eye movement, using eye-tracking information provided by eye-tracking unit 126.

The display components can further include a waveguide carrier 206 to which optical system 110 can be mounted. Waveguide carrier 206 may include one or more waveguides 208 stacked on the user's side of the waveguide carrier 206, for each of the left eye and right eye of the user. The waveguide carrier 206 may have a central nose bridge portion 210, from which its left and right waveguide mounting surfaces can extend. One or more waveguides 208 can be stacked on each of the left and right waveguide mounting surfaces of the waveguide carrier 206, for receiving light emitted from light engine 112 and steered by display engine 114. The waveguides 208 can project such light into user's left eye 202L and right eye 202R of the user. Optical system 110 can be mounted to chassis 102 through a center tab 212 located at the top of waveguide carrier 206 over the central nose bridge portion 210.

Figure 3A:
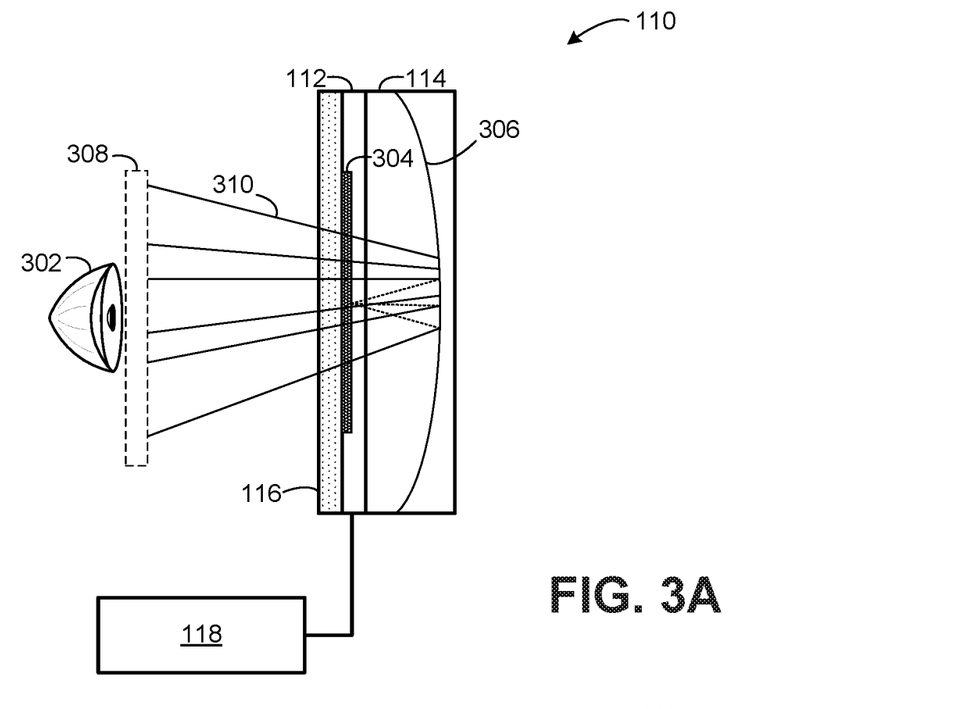

FIG. 3A depicts an example implementation of optical system 110 that can be used to propagate a generated image toward a user's eye 302. As depicted in FIG. 3A, optical system 110 may include a light engine 112, which may include a light emitter 304 for producing light rays. Light emitter 304 may be any type of light emitting device, such as a light-emitting diode (LED), an organic light-emitting diode (OLED), or a laser diode. Light engine 112 may produce light rays representing an image for propagation toward user's eye 302. The light rays from light emitter 304 may travel toward an optical element 306 of display engine 114 for collimation. In one implementation, optical element 306 may be a single lens, which may be a lens having a partially reflective/transmissive coating that can allow incident light to pass through, while also reflecting the light generated by light emitter 304 toward user's eye 302.

Generally, optical system 110 utilizes optical element 306 to reflect light rays toward eye box 308, and the range of angles arriving into the eye box defines the FOV of the generated image. In an ideal scenario, for each image point at optical infinity the rays of light reflected from display engine 114 toward the entire width of the eye box would be perfectly parallel, so that wherever the user's eye moves within the eye box, a sharp image would be viewed based on the parallel nature of the light rays. However, due to aberrations that may be associated with optics used in the device, typically the rays that arrive on the entire width of the eye box are not perfectly parallel, as depicted by light rays 310 (shown greatly exaggerated for purposes of illustration). Consequently, as the user's eye moves across the eye box, the image resolution may degrade due to the aberrations. In this instance, adaptive optics 116 can be utilized to perform aberration correction, and furthermore, may utilize eye-tracking information to perform correction of light rays that correspond to an area specified by the eye-tracking information. Such information may be communicated to adaptive optics 116 by way of controller 118.

Figure 3B:
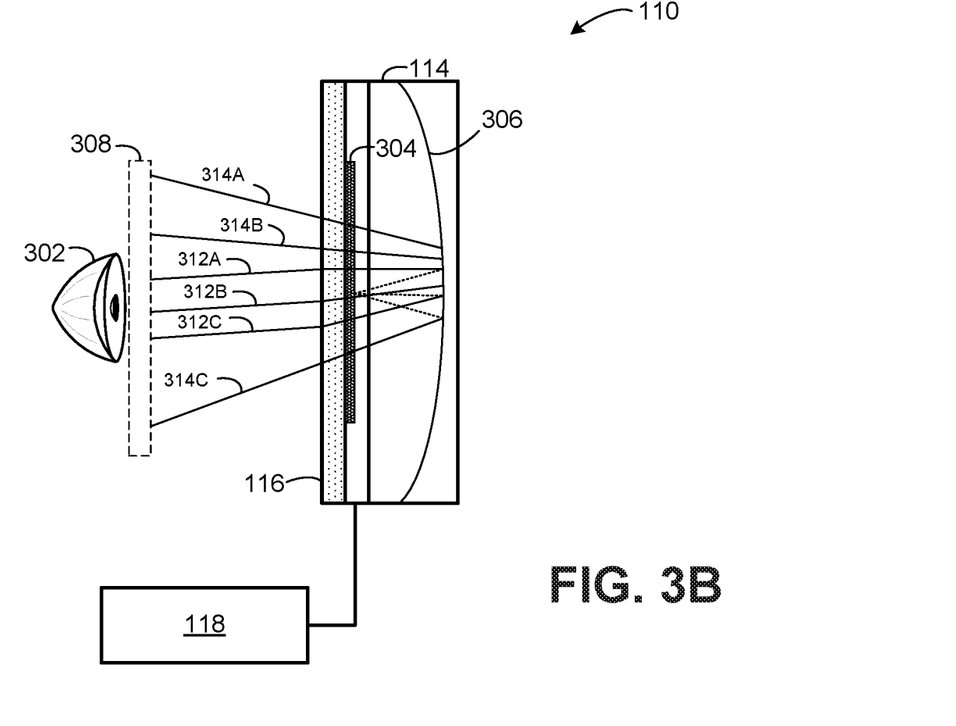

FIG. 3B depicts optical system 110 utilizing adaptive optics 116 to apply correction to the light rays. Specifically, upon reflection of the light rays from optical element 306, the light rays may pass through adaptive optics 116, which may perform correction on the rays based at least on the known size of the eye box, or based at least upon eye-tracking information provided by controller 118. As depicted in FIG. 3B, the eye-tracking information may provide the user's pupil position and gaze direction, and consequently, adaptive optics 116 may apply correction to light rays that are known to correspond to the user's pupil position and gaze direction. As depicted in FIG. 3B, adaptive optics 116 may provide correction to light rays 312A, 312B, and 312C to modify the angles of the light rays so that the light rays are nearly parallel, in order to provide a high quality image for the portion of the eye box corresponding to the fovea of user's eye 302. Based at least on the eye-tracking information, adaptive optics 116 need not perform optimization processing on light rays 314A, 314B, and 314C, as these light rays are directed to the periphery of user's eye 302, which has a lower perceptive power than the fovea of the eye.

Figure 3C:
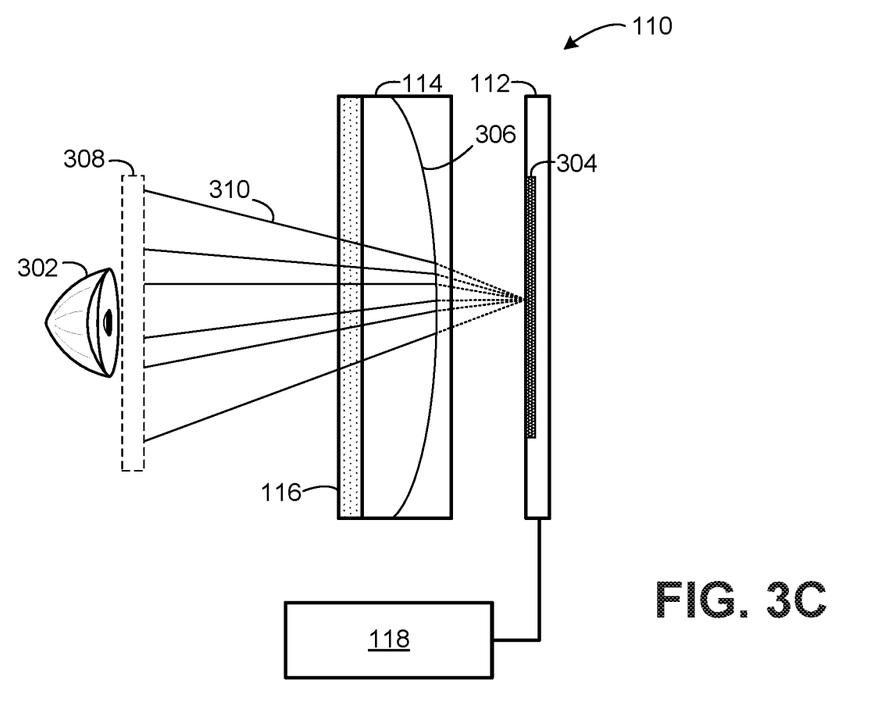

It is to be appreciated that, in certain instances specific to a VR implementation, optical element 306 may transmit or refract rays of light, instead of reflecting light rays. That is, while FIG. 3A depicts an AR implementation where light rays 310 are reflected from display engine 114, it is to be appreciated that light engine 112 and display engine 114 may be positioned such that optical element 306 is between light emitter 304 and user's eye 302, as depicted in FIG. 3C. In this implementation, optical element 306 can refract light rays generated by light emitter 304 toward the user's eye box, and adaptive optics 116 can apply correction to light rays as appropriate based on the user's pupil position and gaze direction.

Figure 3D:
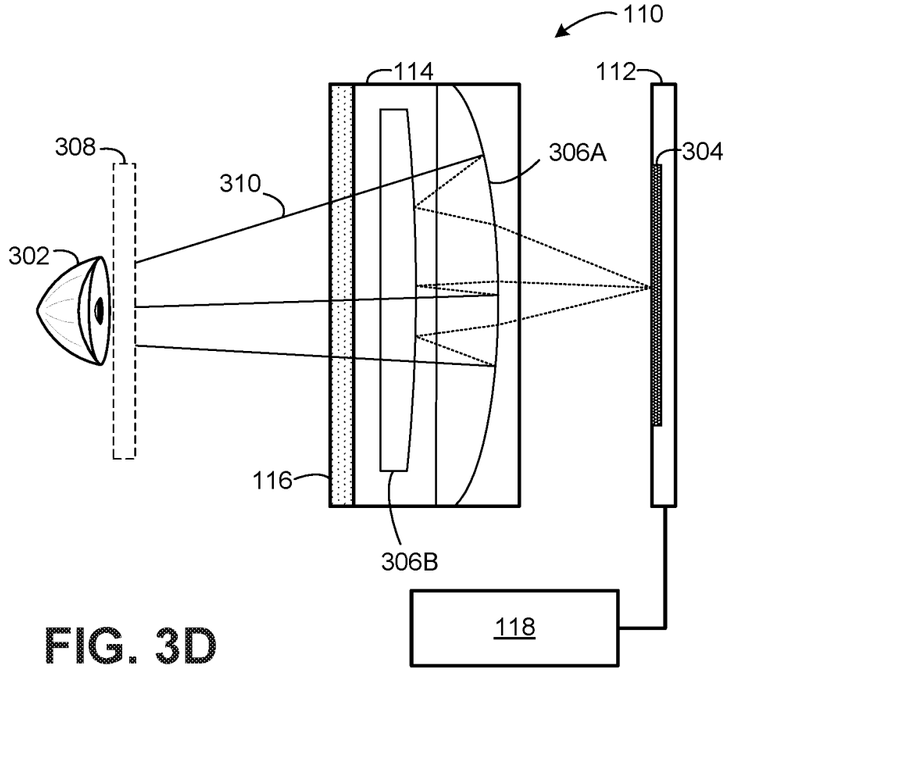

FIG. 3D depicts an alternate implementation of a VR optical system utilizing optical elements that can transmit or refract rays of light. As depicted in FIG. 3D, display engine 114 may utilize a catadioptric lens array, where two optical elements 306A and 306B may be utilized instead of a single optical element. As depicted in FIG. 3D, light rays generated by light emitter 304 may refract by way of optical element 306A, reflect off optical element 306B back to optical element 306A, reflect back towards optical element 306B, and transmit or refract by way of optical element 306B toward the user's eye box. In such implementations, optical elements 306A and 306B can be made to shift from being reflective to being transmissive by modifying aspects of the optical elements, such as by rotating the polarization with a reflective polarizer and quarter-waveplate. In this implementation, optical elements 306A and 306B can direct light rays generated by light emitter 304 toward the user's eye box, and adaptive optics 116 can apply correction to light rays as appropriate based on the user's pupil position and gaze direction.

Figure 4:
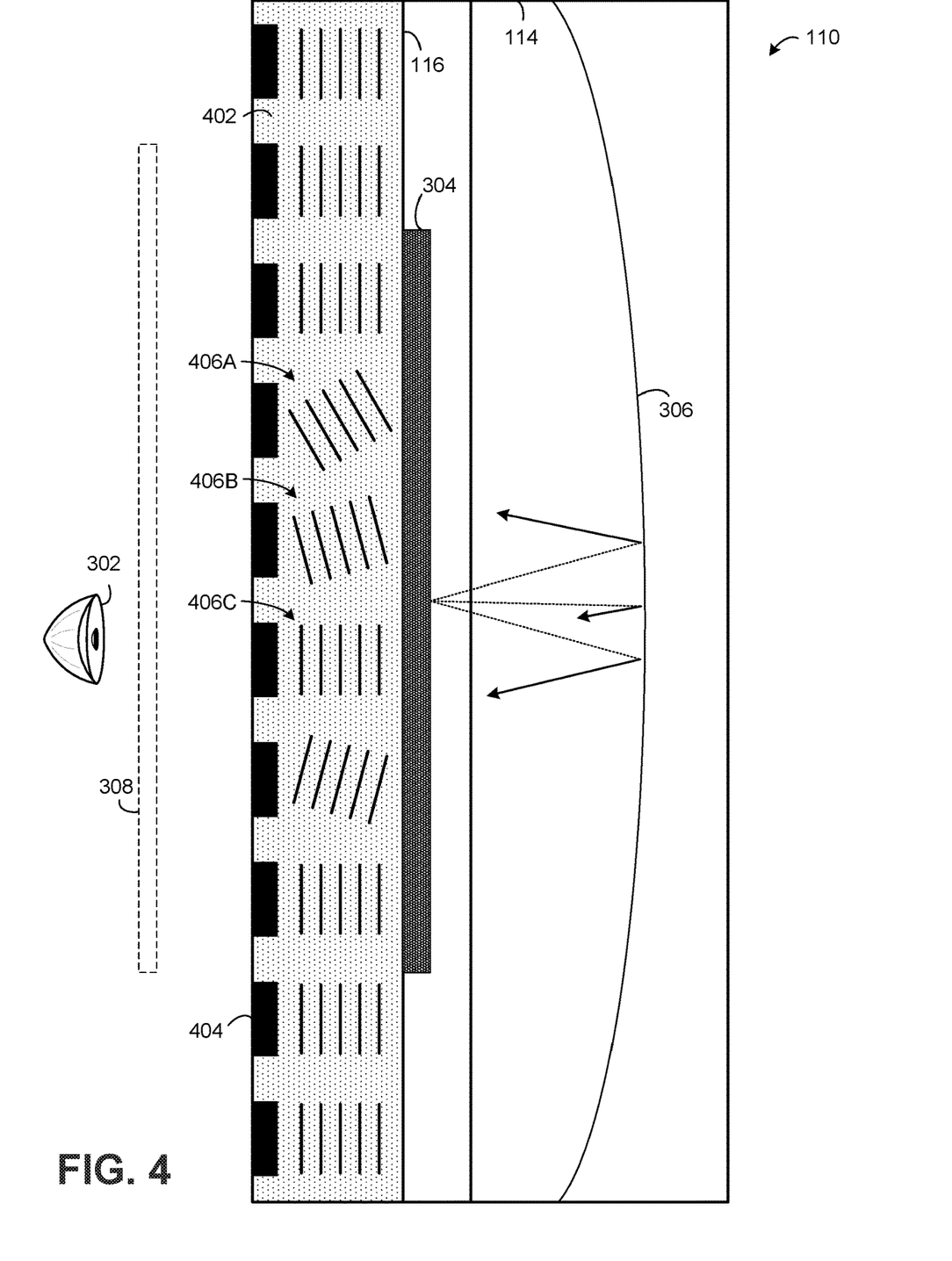

FIG. 4 depicts optical system 110 in greater detail, and specifically depicts an implementation of adaptive optics 116, which can provide the correction functionality discussed above. As depicted in FIG. 4, adaptive optics 116 may include a corrective element 402 that may have one or more modifying elements 404 that can be positioned relative to corrective element 402. Modifying elements 404 can be selectively activated or deactivated to modify corrective element 402 based on instructions received from controller 118. For example, in one implementation, corrective element 402 may be a liquid crystal element, and modifying elements 404 may be electrodes that can provide an electrical charge to the liquid crystal in order to modify the refractive index associated with portions of the liquid crystal. It is to be appreciated that while FIG. 4 depicts a single uniform corrective element 402, there may be multiple corrective elements, such as separate liquid crystal elements.

More specifically, as depicted in FIG. 4, each modifying element may be a linear electrode that can individually cause an adjacent linear row portion of the liquid crystal material to behave in a different way and generate a variable local refractive index. For example, as shown in FIG. 4, the liquid crystal molecules 406A are shown significantly tilted due to a specific electrical influence from the electrode associated with those molecules, producing a greater refractive index, whereas the liquid crystal molecules 406B are less tilted and the liquid crystal molecules 406C are not tilted and parallel to the underlying linear electrode, producing a reduced refractive index. In some embodiments, the voltage applied to each linear electrode can correlate to the resulting effect on the liquid crystal molecules, with higher local applied voltages resulting in relatively greater local refractive indexes. Based on the voltages applied to the linear electrodes, the "surface sag" of certain portions of the liquid crystal can be modified to enable the light rays to be aligned in parallel, resulting in high resolution imagery at the fovea of the eye.

Thus, as depicted in FIG. 4, upon determining the pupil position and gaze direction of user's eye 302, the modifying elements 404 can be used to adjust corrective element 402 in order to appropriately direct high resolution light rays toward the fovea of user's eye 302. Moreover, because user's eye 302 is only in a specific portion of eye box 308, which is known based on the eye-tracking information, optical system 110 need not perform correction of light rays across the entire eye box, saving processing requirements and enabling the use of thinner optical components.

Figure 5:
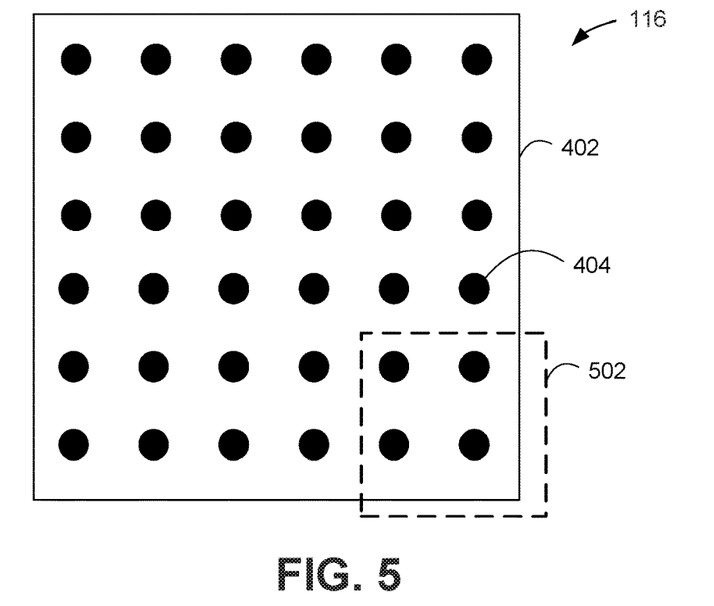

FIG. 5 depicts an implementation of adaptive optics 116, and more specifically, an example organization of modifying elements 404 relative to corrective element 402. As depicted, modifying elements 404 may be spatially displaced with respect to corrective element 402, such that controller 118 can specify that certain modifying elements should be selectively activated or deactivated. For example, controller 118 may determine that a pupil position and gaze direction of a user's eye is directed toward a lower portion of the eye box, and as such, may activate modifying elements that fall within subset portion 502 of corrective element 402.

Figure 6:
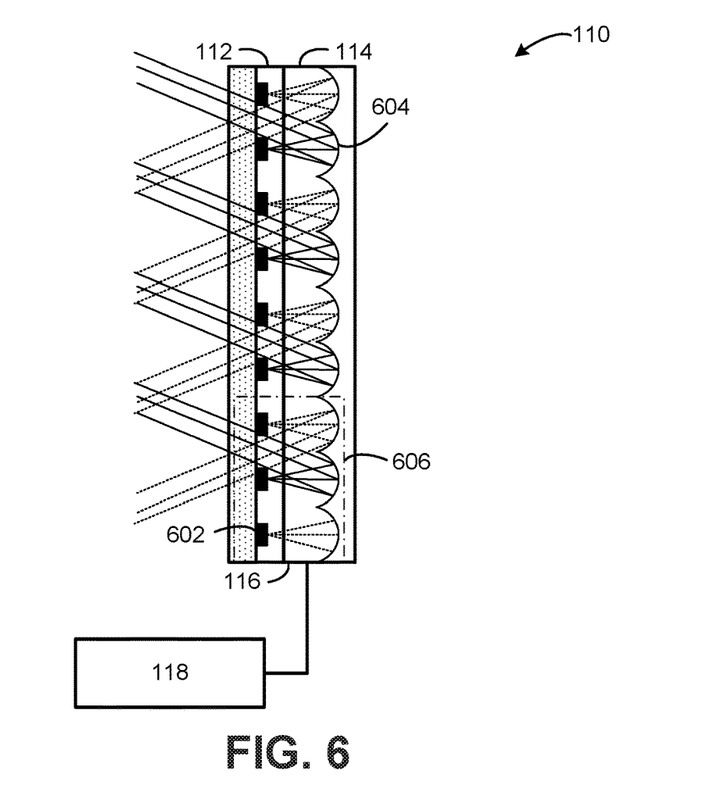

FIG. 6 depicts an alternative implementation of optical system 110. In this implementation, light engine 112 may include a light emitter array 602, which may be controlled by controller 118 to emit display light. The light emitters of array 602 may comprise LEDs, OLEDs, laser diodes, or other such light emitting devices. The light emitter array 602 may be arranged such that individual light emitters of the array are placed relative to an MLA 604 of display engine 114. The MLA 604 may include a number of micro-lenses corresponding to the number of emitters of the light emitter array 602. The micro-lenses of MLA 604 can be as small as a fraction of a millimeter, which can allow the retardation of the corrective element of adaptive optics 116 to be significantly less as the maximum aberration decreases. For example, if the aberration is defocusing of an image, the size of the correction increases to the square of the radius. Therefore, a 1 mm radius lens can have a maximum retardation/thickness about 1,000 times less compared to a 30 mm lens with the same focus distance.

As depicted in FIG. 6, a plurality of micro-lenses may form a cluster 606 of micro-lenses, depicted as having three micro-lenses in FIG. 6. However, it is to be appreciated that cluster 606 could include any number of micro-lenses. Furthermore, while FIG. 6 depicts MLA 604 in a single dimension, it is to be appreciated that MLA 604 may constitute a plurality of neighboring reflective lenses in two dimensions, and the reflective lenses may be of any size and shape. While conventional reflective and refractive are shown, the micro-lenses could also be made with gradient index materials, or as geometric phase devices such as polarization holograms or from metamaterials.

Figure 7:
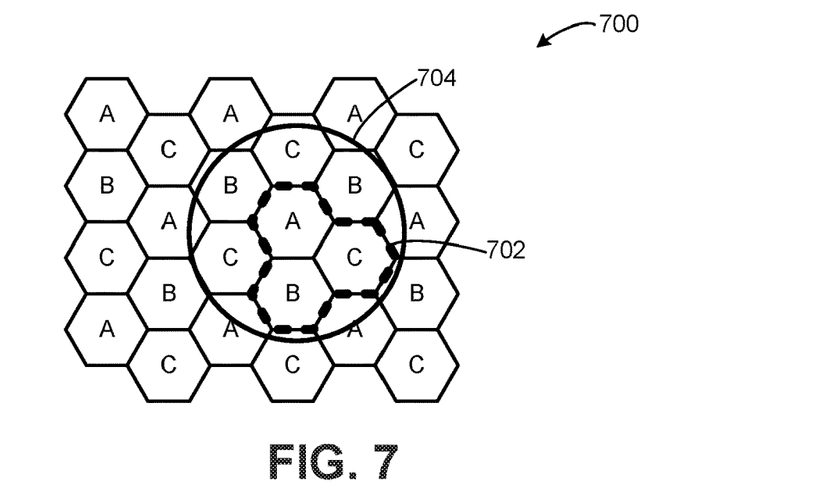

FIG. 7 illustrates an example arrangement 700 of a plurality of clusters 702 of micro-lenses that are hexagonal-shaped (e.g., micro-lens A, micro-lens B, micro-lens C) and that may be implemented in an MLA, such as MLA 604 shown in FIG. 6. Each cluster 702 of micro-lenses may be similar in size or smaller than an average human pupil 704. This can ensure that at any point, the user can see all of the different micro-lenses that constitute a cluster (e.g., at least one micro-lens A, at least one micro-lens B, at least one micro-lens C). The small cluster size can also allow for the user to perceive uniform intensity across the cluster. Moreover, keeping the size of a cluster small can minimize the visual interference with the perceived view of the user.

Each cluster 702 may form the entire virtual image. Further, each micro-lens within each cluster 702 may be configured to form a different part of the virtual image. For example, micro-lens A may form a first part of the virtual image, micro-lens B may form a second part of the virtual image, and micro-lens C may form a third part of the virtual image such that the cluster of micro-lens A, B, and C cooperatively form the entire virtual image. The plurality of clusters 702 can cooperatively form the field of view and the eye box provided to the user's eye. Furthermore, the clusters may be repeated to increase the eye box size.

Figure 8:
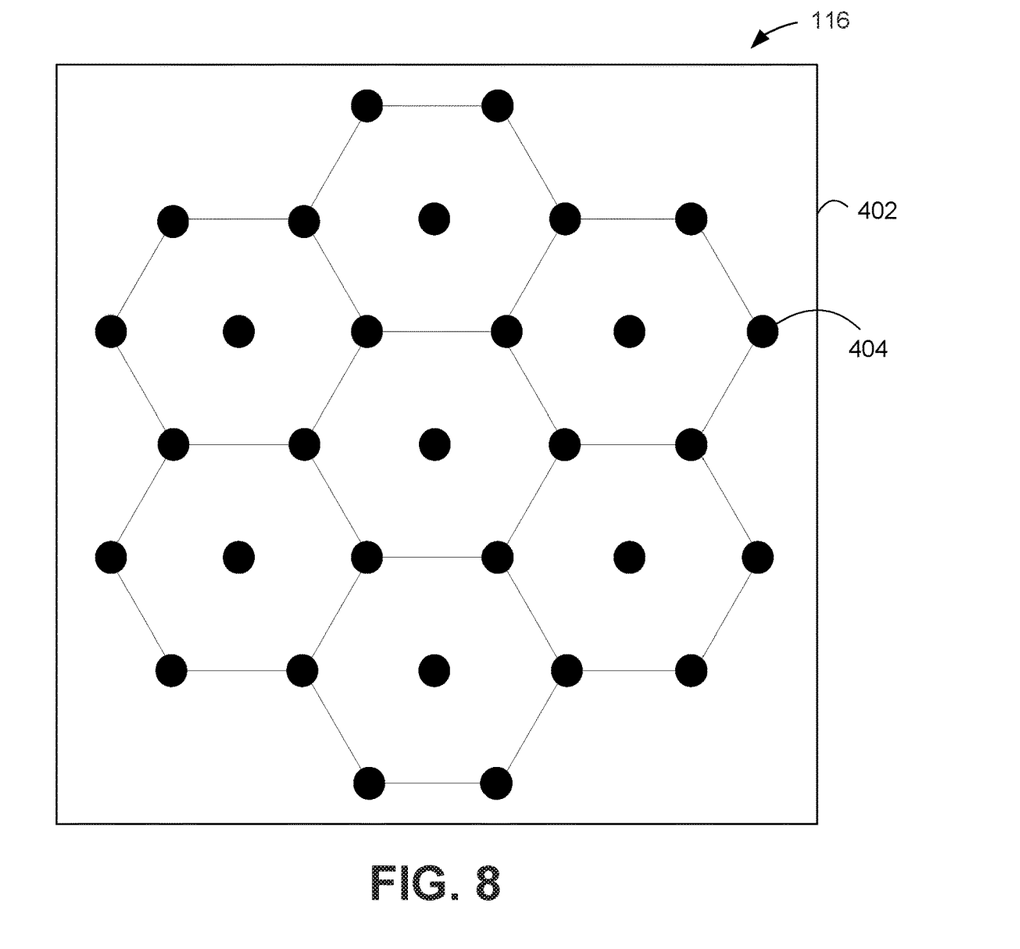

Due to the hexagonal nature of the micro-lenses depicted in FIG. 7, the configuration of adaptive optics 116 can be modified to reflect the shape and sizes of the micro-lenses. FIG. 8 depicts an implementation of adaptive optics 116, based on arrangement 700. As depicted in FIG. 8, corrective element 402 may have one or more modifying elements 404 that can be positioned relative to corrective element 402, and based on the hexagonal arrangement of MLA 604, modifying elements 404 may be similarly positioned in a hexagonal shape.

As discussed earlier, corrective element 402 may be a liquid crystal element, and modifying elements 404 may be electrodes that can apply varying voltage to the liquid crystal molecules in order to modify local refractive indexes associated with the liquid crystal. Furthermore, because the difference needed to correct the light rays may be asymmetric, an asymmetric difference surface sag pattern may be used to provide proper correction of the light rays. In this instance, the hexagonal pattern of the electrodes can provide a more proper pattern for the creation of an asymmetric difference surface sag pattern, as opposed to the grid pattern depicted in FIG. 5.

Figure 9:
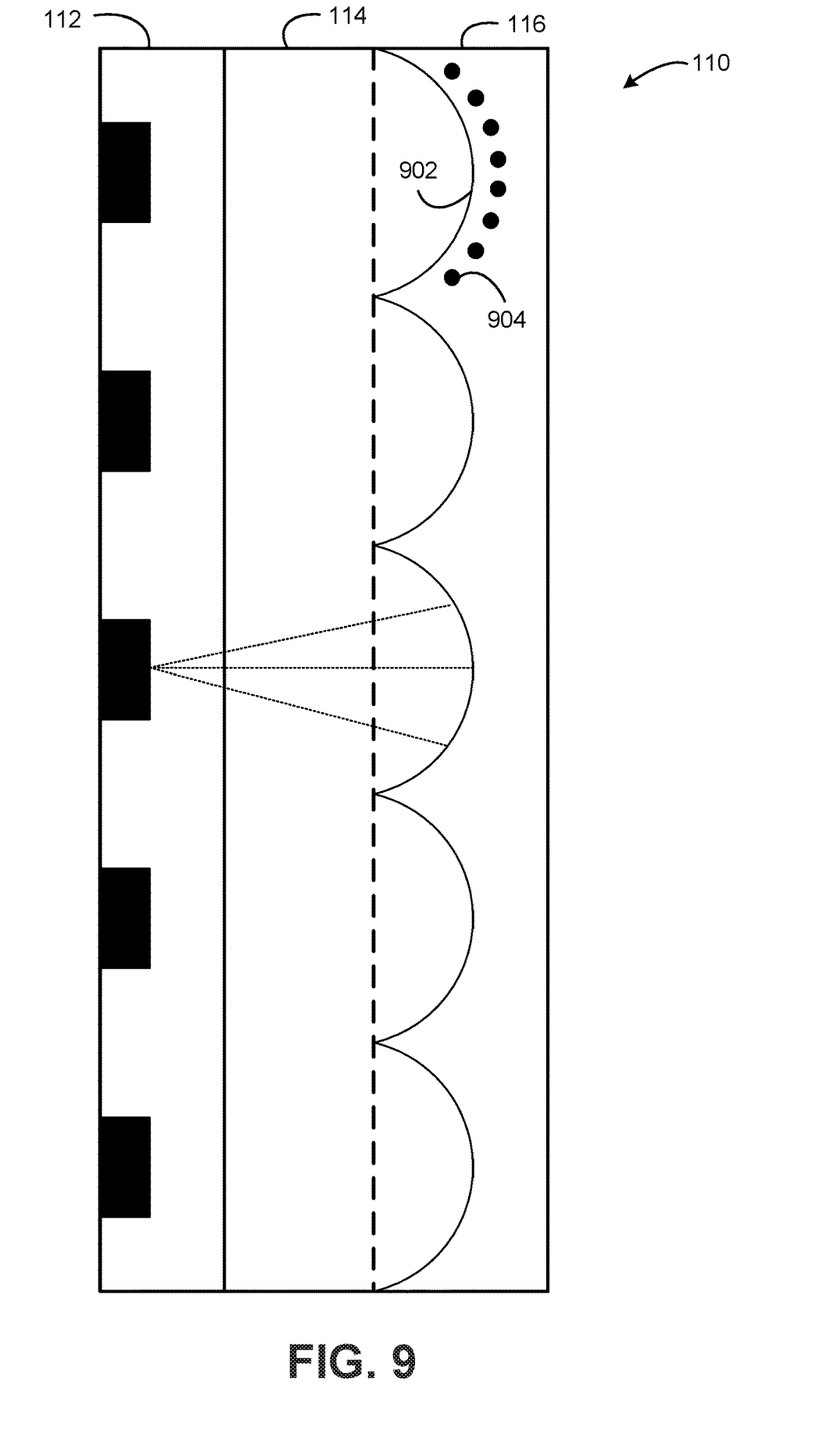

It is to be appreciated that corrective element 402 need not be a liquid crystal element, but can be any sort of programmable or variable lens such as a liquid lens, or any sort of material that may be used to correct light rays, such as diffractive gratings or deformable membranes. For example, FIG. 9 depicts an alternative implementation of optical system 110, where display engine 114 may have adaptive optics 116 incorporated as a subset of the display engine. Specifically, adaptive optics 116 may include one or more deformable mirrors 902 that may serve as a corrective element. Deformable mirrors 902 may be made of a flexible semitransparent membrane that is reactive to electrical charges. Furthermore, one or more electrodes 904 may serve as modifying elements and based on instructions received from controller 118, electrodes 904 may apply voltage that can cause deformable mirrors 902 to flex and modify, thereby correcting light rays as appropriate.

Example Adaptive Optics Processing Method

Figure 10:
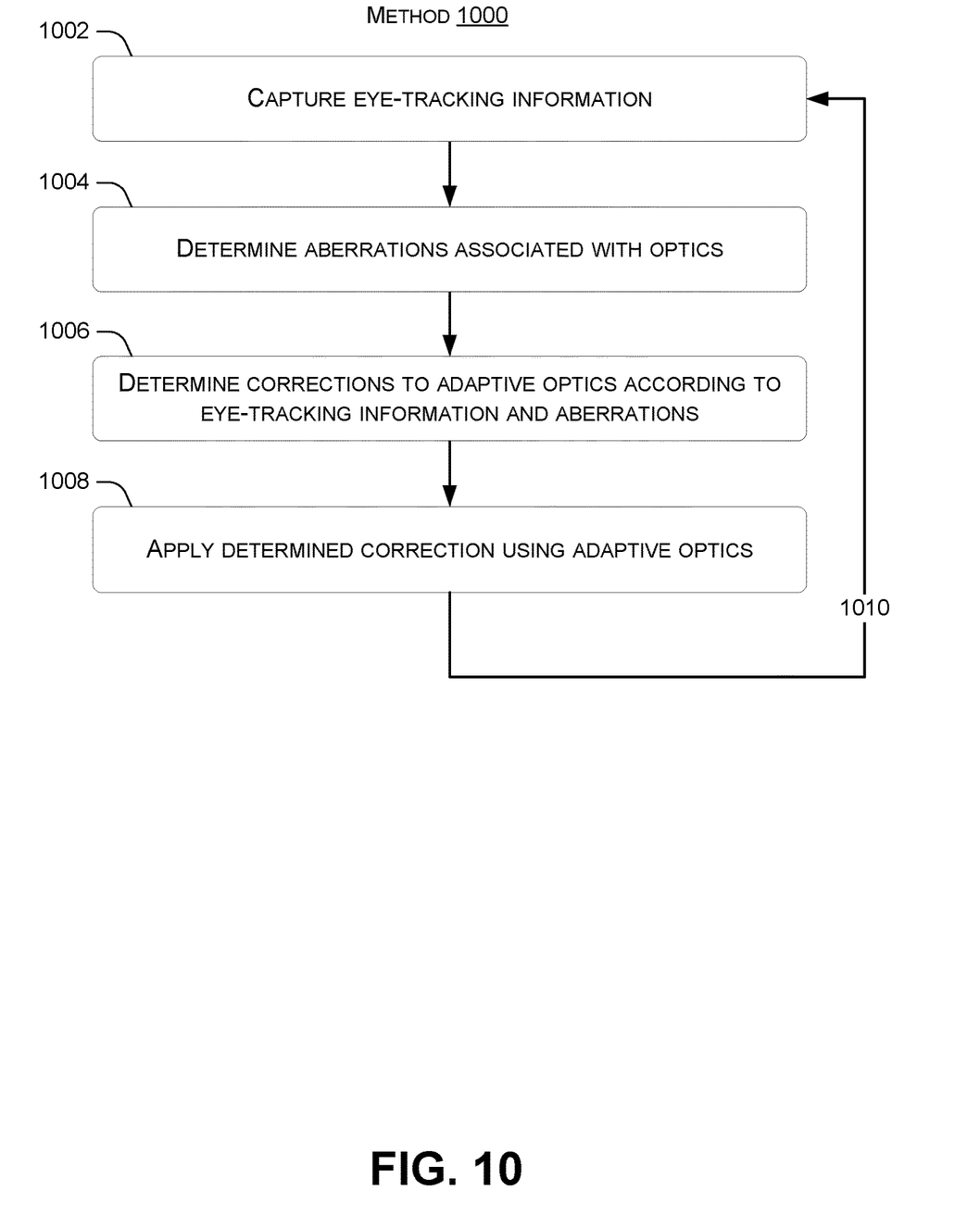
FIG. 10 illustrates an example method or technique that is consistent with some implementations of the present concepts.

The following discussion presents an overview of the functionality associated with adaptive optics described above. FIG. 10 illustrates an example method 1000, consistent with the present concepts. Method 1000 can be implemented by a single device, e.g., NED device 100, or various steps can be distributed over one or more servers, client devices, etc. Moreover, method 1000 can be performed by one or more components, such as light engine 112, display engine 114, adaptive optics 116, and controller 118 of FIG. 1, and/or by other components.

At block 1002, eye-tracking unit 126 may capture eye-tracking information that specifies the pupil position and gaze direction associated with a user's eye. Specifically, eye-tracking unit 126 may output eye-tracking information that captures an x,y,z position of the pupil, and a directional vector associated with the gaze direction, including a possible distance of the user's eye from the eye-tracking unit. This information can provide a six dimensional model associated with the user's eye.

At block 1004, controller 118 may determine aberrations that may be associated with the optics used in NED device 100. In one implementation, controller 118 may access a simplified model associated with the optics in order to determine the aberrations that may be experienced by the user. For example, a designer of NED device 100 may understand that optics used in the device exhibit a high level of chromatic aberrations, and can therefore provide a specific aberration correction that should be universally applied via adaptive optics 116. Such specific aberration correction data can be stored, for example, in memory 122, or may be downloaded to NED device 100 via communication unit 124.

At block 1006, controller 118 can determine corrections to adaptive optics 116 according to the eye-tracking information and the aberrations determined to be associated with the optics of NED device 100. In one implementation, controller 118 may access an adaptive optics model, which may be a model that specifies the type of adaptive optics that is used in the device, including information on the type of specific corrective element and the positioning of modifying elements associated with the corrective element. For example, the adaptive optics model may provide a look-up table that specifies the corrective element as a liquid crystal element, and associated with certain liquid crystal layers, the table may specify a voltage range that can be applied to the modifying elements (e.g., electrodes) based on the eye-tracking information. Based at least on the look-up table and the eye-tracking information, controller 118 can determine specific voltages that can be applied to the liquid crystal element in order to provide the change in surface sag of the liquid crystal element.

In certain implementations, a look-up table may not be pre-defined, but can be created through repeated use of NED device 100. For example, a neural network could be utilized that could determine the existence of certain aberrations, and through machine learning, could determine appropriate voltages to apply to the corrective element in order to correct for such aberrations. Equally, the neural network could utilize the eye-tracking information to deduce what modifying elements should be activated or deactivated to ensure that high quality light rays are received at the user.

At block 1008, controller 118 may apply the determined correction using adaptive optics 116. In one implementation, controller 118 can instruct adaptive optics 116 to apply the determined voltages to the liquid crystal element using the electrodes. The applied voltages can ensure that the liquid crystal element exhibits the surface sag that is desired to appropriately correct aberrations and direct high resolution light rays to the user's eye.

Finally, at step 1010, the process may return to block 1002 to capture a new pupil position and gaze direction associated with the user's eye.

Device Implementations

As noted above with respect to FIG. 1, NED device 100 may include several components and/or devices, including an optical system 110, and a controller 118. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 122 can be storage resources that are internal or external to any respective devices with which it is associated. Memory 122 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 122.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), holographic processing units (HPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Various device examples are described above. Additional examples are described below. One example includes a device comprising an eye-tracking unit configured to detect eye-tracking information associated with a user's eye and an optical system comprising a light engine for emitting light rays, a display engine comprising a plurality of lenses for reflecting the emitted light rays, and adaptive optics comprising a plurality of corrective elements associated with the plurality of lenses, the corrective elements configured to apply correction to light rays that are within an area associated with the eye-tracking information.

Another example can include any of the above and/or below examples where the eye-tracking information comprises a pupil position and a gaze direction of the user's eye Another example can include any of the above and/or below examples where the plurality of corrective elements comprises at least one of liquid crystal elements, diffractive gratings, or deformable membranes.

Another example can include any of the above and/or below examples where the corrective elements are modified by one or more modifying elements.

Another example can include any of the above and/or below examples where the one or more modifying elements are electrodes.

Another example can include any of the above and/or below examples where the corrective elements are configured to apply correction to light rays based on voltage received from the electrodes.

Another example can include any of the above and/or below examples where the plurality of lenses are hexagonal-shaped, and the electrodes are positioned in a hexagonal shape.

Another example can include any of the above and/or below examples where the correction to the light rays corrects the light rays to be parallel.

Another example can include any of the above and/or below examples where the area associated with the eye-tracking information is an area corresponding to an eye box associated with the user.

Another example can include any of the above and/or below examples where the area associated with the eye-tracking information is an area corresponding to a fovea of the user's eye.

Another example can include any of the above and/or below examples where only a subset portion of the corrective elements apply correction to the light rays.

Another example includes a method comprising capturing eye-tracking information associated with an eye of a user of a device, determining aberrations that are associated with optics used in the device, determining corrections to adaptive optics according to the captured eye-tracking information and the determined aberrations, and applying the determined corrections using the adaptive optics.

Another example can include any of the above and/or below examples where applying the determined corrections using the adaptive optics comprises applying a modification to a corrective element of the adaptive optics.

Another example can include any of the above and/or below examples where the modification is made by electrodes applying voltage to the liquid crystal element.

Another example can include any of the above and/or below examples where the eye-tracking information comprises a pupil position and gaze direction of the eye of the user.

Another example includes a device comprising an eye-tracking unit configured to detect eye-tracking information associated with a user of the device and a corrective element configured to receive voltage applied by a modifying element, the voltage modifying the corrective element to correct light rays according to the detected eye-tracking information.

Another example can include any of the above and/or below examples where the eye-tracking information comprises a pupil position and a gaze direction of the user of the device.

Another example can include any of the above and/or below examples where the corrective element comprises at least one of a liquid crystal element, a diffractive grating, or a deformable membrane.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:
1. A method comprising:
capturing eye-tracking information associated with an eye of a user of a device;
determining aberrations that are associated with optics used in the device, the aberrations including non-parallel light rays;
determining corrections to adaptive optics based on the eye-tracking information and the aberrations, the corrections including modifying local refractive indexes associated with a subset portion of a plurality of corrective elements of the adaptive optics; and
applying the corrections to the adaptive optics to correct the non-parallel light rays that are within an area associated with the eye-tracking information to be parallel.

2. The method of claim 1, wherein applying the corrections to the adaptive optics comprises applying a modification to the subset portion of the plurality of corrective elements of the adaptive optics.

3. The method of claim 2, wherein the plurality of corrective elements comprises a liquid crystal element.

4. The method of claim 3, wherein applying the modification comprises applying a voltage to the liquid crystal element using an electrode.

5. The method of claim 1, wherein capturing the eye-tracking information comprises detecting a pupil position and a gaze direction of the eye of the user.

6. The method of claim 1, wherein applying the corrections to the adaptive optics comprises modifying the subset portion of the plurality of corrective elements using a subset of a plurality of modifying elements.

7. The method of claim 6, wherein modifying the subset of the plurality of corrective elements comprises applying a voltage to the subset of the plurality of modifying elements.

8. The method of claim 7, further comprising:
determining the voltage based on a lookup table.

9. The method of claim 7, further comprising:
determining the voltage based on a neural network.

10. The method of claim 7, wherein the subset portion of the plurality of corrective elements applies the corrections to the non-parallel light rays based on the voltage received from the subset of the plurality of modifying elements.

11. The method of claim 7, wherein a greater voltage applied to the subset of the plurality of modifying elements causes greater modifications to the local refractive indexes associated with the subset portion of the plurality of corrective elements.

12. The method of claim 11, wherein the greater voltage applied to the subset of the plurality of modifying elements causes greater tilting of liquid crystal molecules in the subset portion of the plurality of corrective elements.

13. The method of claim 7, wherein the voltage provides a change in a surface sag of the subset portion of the plurality of corrective elements.

14. The method of claim 1, wherein modifying the subset portion of the plurality of corrective elements comprises applying varying voltages to liquid crystal modules in the subset portion of the plurality of corrective elements to provide an asymmetric difference surface sag pattern.

15. The method of claim 1, wherein the plurality of corrective elements comprises at least one of: liquid crystal elements, diffractive gratings, or deformable membranes.

16. The method of claim 1, wherein correcting the non-parallel light rays to be parallel provides a higher resolution imagery in the area associated with eye-tracking information.

17. The method of claim 1, wherein the area associated with the eye-tracking information corresponds to an eye box associated with the user.

18. The method of claim 1, wherein the area associated with the eye-tracking information is less than an entire eye box associated with the user.

19. The method of claim 1, wherein the area associated with the eye-tracking information corresponds to a fovea of the eye of the user.

20. The method of claim 4, wherein applying the modification comprises tilting liquid crystal molecules in the subset portion of the plurality of corrective elements.

* * * * *